April 28, 1925.
R. R. MILLER
LEVELING MEANS
Filed Feb. 6, 1922
3 Sheets-Sheet 1
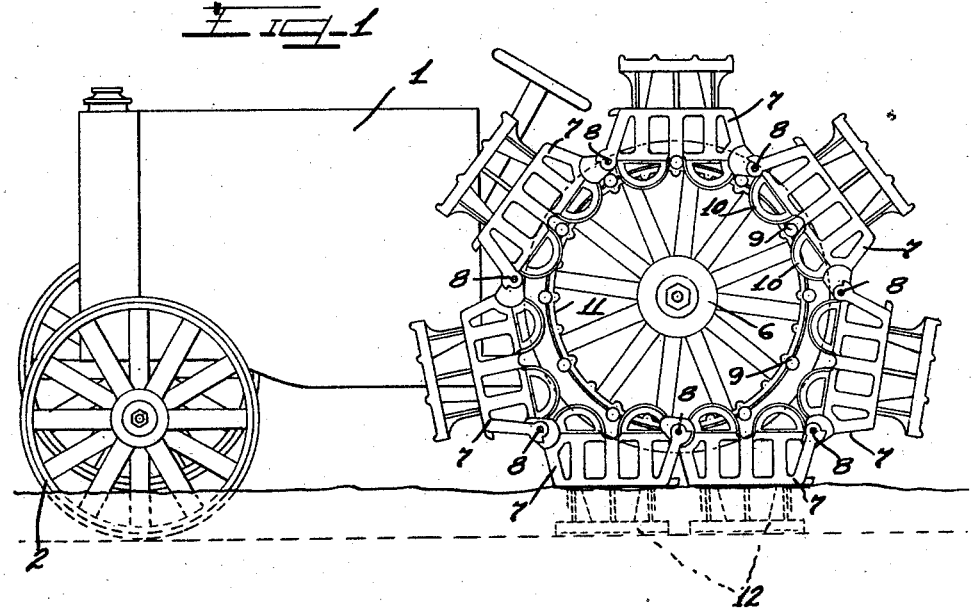
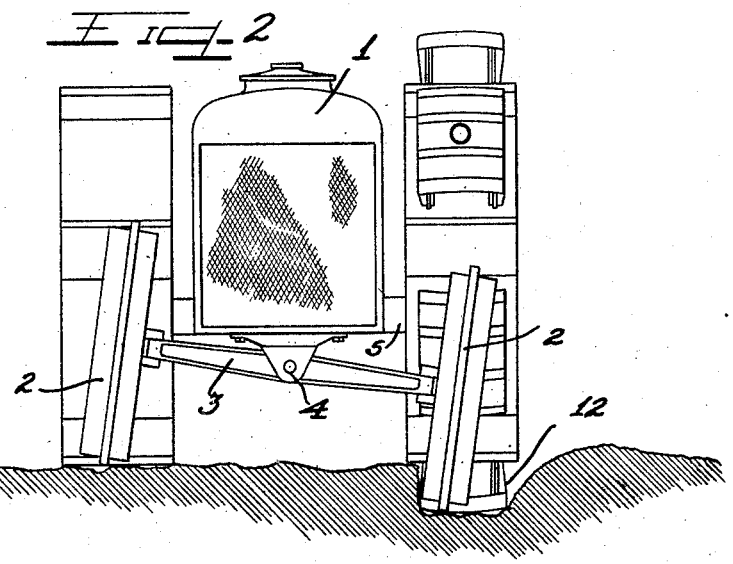

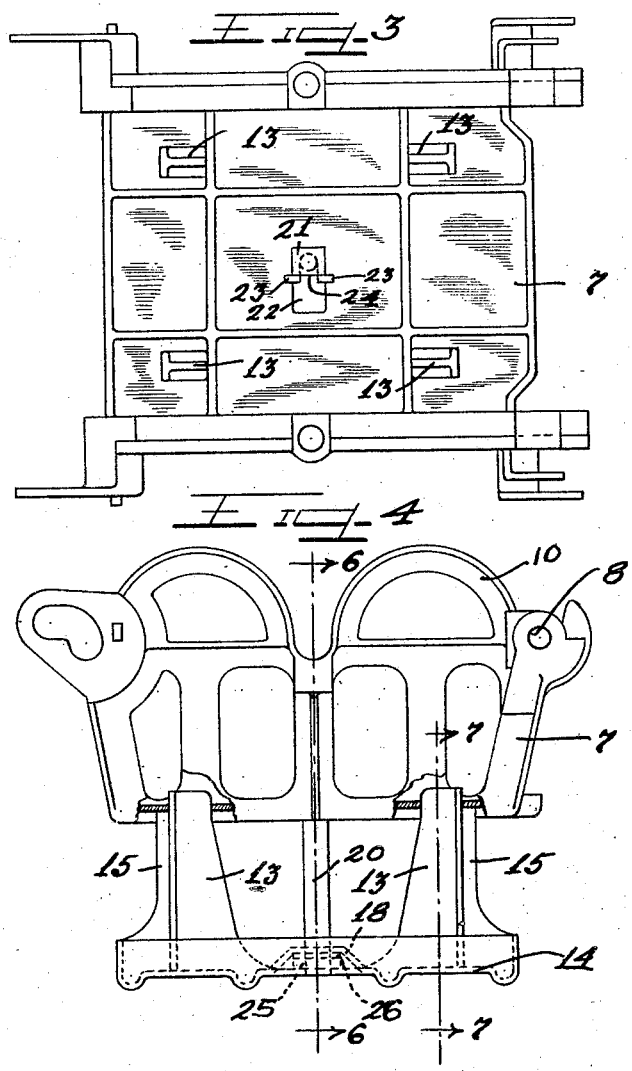

April 28, 1925.
R. R. MILLER
LEVELING MEANS
Filed Feb. 6, 1922
1,535,846
3 Sheets-Sheet 3
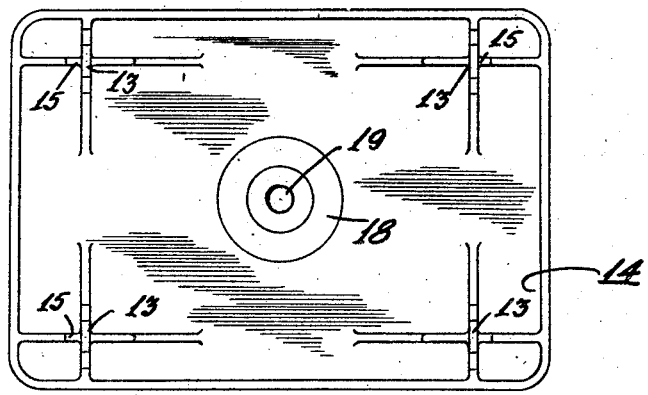
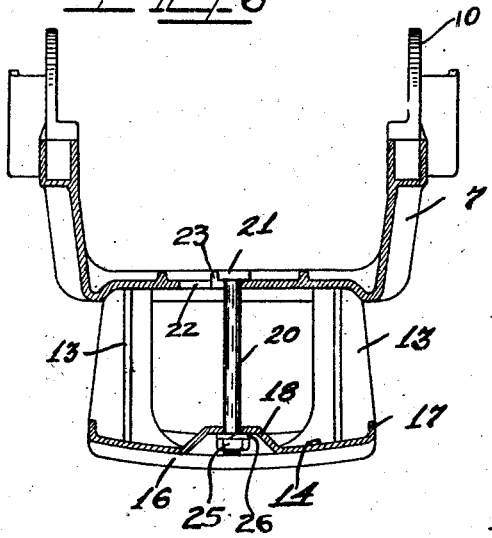
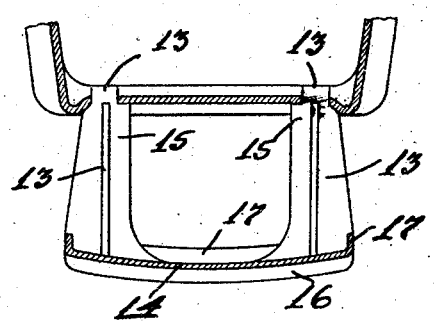
Witnesses
H. G. Marks
Carlton Hill
Inventor
ROYAL R. MILLER
by Charles W. Mills Atty Patented Apr. 28, 1925.

1,535,846

UNITED STATES PATENT OFFICE.

ROYAL R. MILLER, OF CHICAGO, ILLINOIS, ASSIGNOR TO MILLER TRACTION TREAD COMPANY, A CORPORATION OF DELAWARE.

LEVELING MEANS.

Application filed February 6, 1922. Serial No. 534,379.

*To all whom it may concern:*

Be it known that I, ROYAL R. MILLER, a citizen of the United States, and a resident of the city of Chicago, in the county of Cook and State of Illinois, have invented certain new and useful Improvements in a Leveling Means; and I do hereby declare that the following is a full, clear, and exact description of the same, reference being had to the accompanying drawings, and to the numerals of reference marked thereon, which form a part of this specification.

This invention relates to a leveling attachment and particularly to devices which are designed to be detachably mounted on one of a pair of tractor drive wheels to maintain the driving axle of the tractor in a substantially horizontal plane during the operation of plowing.

When a tractor is used as a source of power in plowing, it is ordinarily necessary that the wheels on one side thereof be run in the furrow and this running of the wheels in the furrow of necessity causes a tilting of the tractor, exerting an undue strain on the rear end thereof and at the same time making it difficult to properly steer the tractor. This is particularly true in the case of track-laying tread type drive wheels, and it is an important object of this invention to provide means which may be detachably secured to the drive wheel which is running in the furrow to obviate the necessity of operating the tractor with the rear end thereof in a distorted position.

It is another object of this invention to provide leveling attachments of the class described which may be conveniently attached to and detached from tractor drive wheels of the track-laying tread type.

It is also an object of this invention to provide leveling devices of the class described which are provided with slightly curved ground engaging surfaces which adapt the same to properly engage the ground to center and balance the load on the tractor driving wheel.

It is another object of this invention to provide means which are adapted to be detachably secured to a tractor driving wheel to facilitate the steering of the tractor during the operation of plowing.

It is an important object of this invention to provide a device of the class described which may be economically manufactured and which does not become clogged in use, and which does not increase the power required.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of a tractor having a track-laying tread type drive wheel and equipped with the improved leveling means of this invention.

Figure 2 is a front elevation of the tractor shown in Figure 1.

Figure 3 is an inside plan view of a track-laying tread element showing one of the leveling devices secured thereto.

Figure 4 is a side elevation, with parts in section, of one of the tread elements, showing a leveling device attached thereto.

Figure 5 is an inside plan view of one of the leveling devices.

Figure 6 is a section on the line 6—6 of Figure 4 showing the attaching bolt in elevation.

Figure 7 is a fragmentary section on the line 7—7 of Figure 4.

As shown on the drawings:

The leveling means of this invention are shown in connection with a tractor 1 which is provided with the usual front wheels 2 mounted on a front axle 3 which is centrally pivoted on the tractor frame at 4 thereby allowing the front end of the tractor to be run over uneven surfaces without distortion of the frame thereof. The tractor 1 is provided with the usual rigidly mounted rear axle 5 having differentially driven drive wheels 6 mounted at its outer ends, and detachably mounted on these drive wheels I have shown a track-laying tread type driving mechanism of the type shown in my co-pending application for patent Serial No. 568,992, filed June 17, 1922. This track-laying tread type of driving mechanism comprises essentially a plurality of tread elements 7 which are connected together with a lost motion connection by means of pins 8 engaged through cam slots formed in the ends of adjacent tread elements 7, the tread elements being advanced for successive contact with the surface over which the tractor is traveling by means of driving pins 9 which engage between projections 10 on said tread elements and which are mounted on supporting annuli 11 which are detachably mounted on the drive wheel 6.

In the process of plowing, the tractor drive wheel 6 and the front wheel 2 on one side of the tractor will necessarily run in a furrow 12 and in order to maintain the tractor in an advantageous operating position the leveling means of this invention are attached on the drive wheel or on the tread elements of said drive wheel thereby acting to maintain said drive wheel and the tractor in the position shown in Figures 1 and 2. These leveling means and the devices which are provided for attaching the same to the tread elements are clearly shown in Figures 4 to 7 inclusive and will now be described.

The ground engaging portion of each of the tread elements 7 is provided with four apertures, each of which has engaged therethrough the end of a ribbed leg 13 which extends upwardly from and is integral with a ground engaging portion 14 of the leveling device. Said ribbed legs 13 are also each provided with an integral rib 15 which extends from the ground engaging portion 14 to the outside of the ground engaging portion of the tread element 7. Said ground engaging portion 14 is reinforced on the outside by integral ribs 16 and on the inside by an integral peripheral flange 17, and said ribs 16 and the ground engaging portions 14 are curved to adapt the same to operate properly in furrows of various depths and to so operate as to maintain a substantially equal pressure on the tread elements and on the driving pins 9 on each side of the drive wheel. The ground engaging portion 14 of each of the leveling devices is formed inwardly at its central portion to afford an annular boss 18 which is centrally apertured at 19 and which is adapted to have engaged through said aperture 19 a bolt 20, the head 21 of which is inserted through an aperture 22 in the ground engaging portion of the tread element 7, and subsequent to this engagement through said aperture 22 is lifted over and positioned against a pair of inwardly extending lugs 23 formed on the ground engaging portion of the tread element 7 at one side of said aperture 22, the bolt 20 at this time being engaged through a slot 24 which is of a width substantially equal to the diameter of said bolt and which is formed as a continuation of the aperture 22. Said bolt 20 is firmly secured in position by means of a nut 25 and a washer 26 engaged on the outer end thereof and positioned in the depression afforded in the outer face of the ground engaging portion 14 by the boss 18. Said bolt 20 thus acts to firmly secure the leveling device and the tread element together, and in view of the fact that the ribbed legs 13 extend through apertures in the ground engaging portion of said tread element and are provided with ribs 15 which abut the under side of said ground engaging portion, the possibility of relative lateral movement or rocking movement of the leveling devices is obviated.

It will thus be apparent that this invention provides a leveling device which is particularly adapted to be used for the purposes specified and which may be conveniently and quickly attached to or detached from the tread elements.

The provision of this leveling device makes possible the easy steering of the tractor during the plowing operation since the devices on the tread elements are formed of the proper width to line up with the lower inner edge of the front wheel, whereby said front wheel and the leveling devices both contact and are guided by the land side of the furrow.

While the leveling means of this invention have been shown and described herein in connection with a track-laying tread type drive wheel, it is of course apparent that similar means could be provided for use in similarly leveling an ordinary annular drive wheel to maintain the tractor axle on which said wheel is mounted in proper position during the operation of plowing, to facilitate steering and to do away with unnecessary strain on the tractor frame.

I am aware that numerous details of construction may be varied through a wide range without departing from the principles of this invention, and I therefore do not purpose limiting the patent granted otherwise than necessitated by the prior art.

I claim as my invention:

1. The combination with a tractor having track-laying tread type driving means, of leveling means adapted to be detachably secured on said driving means on one side of the tractor to maintain the tractor frame in proper position to be used for plowing.

2. The combination with an automotive vehicle, of driving means on either side thereof, connected tread elements surrounding each of said driving means and driven thereby, and means extending in a vertical plane which are adapted to be detachably secured to the tread elements on one side of the vehicle to maintain the same substantially level when the driving means on said side are traveling in a depression.

3. The combination with an automotive vehicle, of driving means on either side thereof, connected tread elements surrounding each of said driving means and driven thereby, and means of less width than the tread elements detachably secured to each thereof on one side of the vehicle to maintain the vehicle in proper operating position when said side is traveling in a depression.

4. The combination with a tractor having track-laying tread type driving wheels and annular front wheels of less width than said driving wheels, of extensions adapted to be attached to the driving wheel on one side of the tractor to maintain the same substantially level while plowing, the inner side of said extensions being positioned to align with the inner side of the front wheel on the same side of the tractor.

5. The combination with a tractor having front and rear rotatable supporting members, of extension leveling means adapted to be secured to one of said rear members for increasing its diameter when traveling in a depression.

6. The combination with a tractor having front and rear rotatable supporting elements of radially extending extension members removably secured to one of said rear elements for increasing its diameter when traveling in a depression for leveling said tractor.

In testimony whereof I have hereunto subscribed my name in the presence of two subscribing witnesses.

ROYAL R. MILLER.

Witnesses:
CARLTON HILL,
JAMES M. O'BRIEN.